United States Patent [19]

Braun

[11] 3,956,253

[45] May 11, 1976

[54] POLYETHYLENE MOLDING COMPOUNDS OF HIGH-WEAR RESISTANCE

[75] Inventor: Gunther Braun, Oberhausen, Germany

[73] Assignee: Ruhrchemie Aktiengesellschaft, Oberhausen, Germany

[22] Filed: Sept. 5, 1975

[21] Appl. No.: 610,657

Related U.S. Application Data

[63] Continuation of Ser. No. 396,442, Sept. 12, 1973, abandoned.

[30] Foreign Application Priority Data

Sept. 16, 1972 Germany............................ 2245552

[52] U.S. Cl. .............................. 526/352; 260/42.42; 526/22; 526/57; 526/73
[51] Int. Cl.² ...................................... C08F 8/06
[58] Field of Search ............ 260/94.9 GA, 94.9 GC, 260/96 R, 42.42; 450/623.5

[56] References Cited
UNITED STATES PATENTS

| | | | |
|---|---|---|---|
| 2,993,882 | 7/1961 | Ashby et al................ | 260/94.9 GA |
| 3,242,159 | 3/1966 | Kaufman..................... | 260/94.9 GA |
| 3,449,191 | 6/1969 | Taylor......................... | 260/94.9 GA |
| 3,567,697 | 1/1969 | Bates et al. ................. | 260/94.9 GA |
| 3,576,933 | 4/1971 | Bates et al. ................. | 260/94.9 GA |
| 3,654,315 | 4/1972 | Chang et al................. | 260/94.9 GA |

FOREIGN PATENTS OR APPLICATIONS

| | | | |
|---|---|---|---|
| 7,011,200 | 2/1971 | Netherlands................ | 260/94.9 GA |
| 906,547 | 9/1962 | United Kingdom......... | 260/94.9 GA |

*Primary Examiner*—William F. Hamrock
*Attorney, Agent, or Firm*—Jordan B. Bierman; Linda Bierman; Kenneth J. Stempler

[57] ABSTRACT

A polyethylene composition of high wear resistance and a method of preparing it which comprises a polyethylene prepared according to a low pressure polymerization process and which has a molecular weight above about 1,000,000, containing an organic peroxide cross-linking agent homogeneously dispersed in the polymer, which has been pre-compressed at a high pressure, plasticized at elevated temperature and pressure and cooled.

14 Claims, No Drawings

POLYETHYLENE MOLDING COMPOUNDS OF HIGH-WEAR RESISTANCE

This is a continuation of co-pending Ser. No. 396442, the priority of which is claimed, Ser. No. 396442 claims the priority of German Application Number P 22 45 552. 3-43 of Sept. 16, 1972.

The invention is concerned with polyethylene moulding compounds of high wear resistance comprising polyethylene produced at low pressure having a viscosimetrically determined molecular weight above 1,000,000 and 0.2 to 0.6% by weight of an organic peroxide.

It is known to cross-link polyolefins by means of radiant energy or of free-radical promoting catalysts, as for instance peroxides or azides (H. Wilski, Kunststoffhandbuch, Vol. IV, Polyolefine, Karl Hanser Verlag 1969, page 165 ff), whereby both the molecular weight and the physical properties of the polymer are changed.

Chemical cross-linking processes applied to polyolefines of low or medium molecular weight are known but there have been no prior efforts devoted to increasing the molecular weight of high molecular polyethylene by cross-linking. Polyethylenes with extremely high molecular weights possess certain unfavorable properties which have discouraged such efforts. It has long been supposed by polymer chemists that polyethylenes having molecular weights above 1,000,000 possess maximum impact strength, wear resistance and other favorable properties, and that such properties could not be further enhanced by cross-linking. It is known that the impact strength of polyethylene reaches a maximum at molecular weights of 2,000,000 and decreases with further increasing molecular weight owing to excessive random entanglement of the long molecule chains. In comparison thereto, the wear resistance is further improved with increasing molecular weight.

Since high molecular weight polyethylenes are exceptionally important from a technical standpoint, improved wear resistance is a basic prerequisite for numerous applications. Accordingly, there have been numerous attempts to produce polyethylenes having extremely high molecular weights of up to about 10,000,000 by employing special polymerization conditions. These techniques present numerous difficulties in the polymerization and during further processing of the product, such as formation of incrustations in the reactor, irregular size of granulation and coarseness of the product. Owing to these difficulties inherent in the synthesis process, it has been attempted to achieve an increase of the molecular weight by means of a cross-linking process which can be performed in a simple and economic manner by means of organic peroxides.

Cross-linking of low molecular weight polyethylenes is generally achieved through the addition of about 2% by weight of a peroxide. Since polyethylenes having molecular weights above 1,000,000 do not form real melts but attain a rubber-like elastic consistency on heating, the homogeneous distribution of peroxides in high molecular polyethylenes is encumbered by serious technical difficulties. Moreover, the physical properties of the resulting cross-linked products are frequently not improved in comparison with the untreated starting material and the increase of wear resistance is negligible.

It is an object of the invention to provide a polyethylene composition of high wear resistance comprising a polyethylene prepared at low pressure having a viscosimetrically determined molecular weight above 1,000,000 which contains homogeneously dispersed therein about 0.2 to 0.6 % by weight of an organic peroxide and which has been then precompressed under high pressure and plasticized at elevated temperature and pressure.

The polymers employed as starting materials in the present invention are polyethylenes having molecular weights in excess of about 1,000,000. Particularly suitable are polymers prepared under the well-known low pressure polymerization techniques using the organometallic catalysts commonly referred to as Ziegler-catalysts. Such polymers are substantially unbranched, relatively easily prepared and highly crystalline.

Any peroxide conventionally used for the cross-linking of low molecular weight polyolefins or copolymers of olefins and other monomers is fundamentally suited as a cross-linking agent for the compositions according to the invention, the selection of which is well within the ken of a reasonably skilled chemist. The peroxide should be compatible with the high-polymer, as for example the phthalideperoxides according to German Offenlegungsschrift No. 1,938,503. Especially suited is 3-phenyl-3-t-butyl peroxyphthalide.

The organic peroxide may be applied in admixture with an inert carrier material, preferably $SiO_2$, which is generally used in an amount of 50 to 100% by weight, based on the weight of the peroxide. Different carrier materials known in the art, which do not catalyze the decomposition of the peroxide can also be used.

The peroxide/polyethylene mixture is then precompressed at a high pressure, preferably in the range of 50 to 500 $kp/cm^2$, and subsequently plasticized at an elevated temperature and pressure. Upon cooling a polyethylene composition having greatly enhanced wear resistance is obtained. It has been found especially advantageous to precompress the mixture at pressures of at least 100 $kp/cm^2$ and to plasticize the precompressed material at a temperature of at least 200°C and at a pressure of at least 50 $kp/cm^2$. Ideally the plasticizing pressure does not exceed about 60 $kp/cm^2$.

Any means of mixing may be employed so long as the peroxide is homogeneously distributed throughout the polymer. One method which has been found especially effective is to mix all of the peroxide with a small amount of the polymer to form a peroxide/polyethylene concentrate which is then worked into the remaining portion of polymer. Care must be taken to avoid agglomeration and the formation of grains. Such mixing can be achieved by utilizing any of the numerous quick blenders available. Preferably the blender should be one affording mixing times of 1 to 2 minutes.

A quasi-continuous pressing process for the preparation of profiles from the compositions according to the invention is the so-called ram-extrusion. With the aid of a main ram the material having been fed by means of a feeding hopper is pressed into a ram extrusion moulding device, plasticized by heating of the device and extruded as profile through the die orifice of the device. Both procedures allow the processing of a material having high melt viscosity.

Although the admixture of peroxide-high-molecular polyethylene on heating yields a product having a still higher melt viscosity due to cross-linking, the mixtures can readily be processed by extrusion moulding and ram extrusion.

If working processes are applied, whereby the polyethylene composition passes in the heated state through nonuniform flow paths, as for instance through single or double screw extruders, it is impossible to work the mixture into a homogeneous profile in the device, even at elevated pressures and temperatures.

From the polyethylene compositions according to the invention, moulded articles of any shape can be prepared by sawing, turning, planning, milling, boring or punching with the aid of conventional metal and wood processing devices.

Owing to the cross-linking, the molecular weight of the polyethylene is increased. As stated above, the processing of polyethylene having molecular weights above 1,000,000 is accompanied by difficulties due to their high melt viscosity. The homogenous distribution of the cross-linking agent in the polymer is indispensable in order to obtain uniform cross-linking, and hence satisfactory products.

Polyethylene wear as expressed herein is a function of abrasion and is evaluated by rotating a sample of the polyethylene composition to be tested, mounted on a stirring shaft, at an angular rate of 1200 revolutions per minute for 24 hours in a stirring vessel containing a sand/water mixture. The resulting loss in weight is then determined.

The values of the wear set forth in the following Table and Examples are relative to a value of 100 for the polyethylene starting material for the preparation of the polyethylene compositions according to this invention. The comparison value 100 corresponds to an abrasion of 130 mg of the standard sample. The lower the wear, the higher the wear resistance of the tested polyethylene composition.

In the following table the test data of several polyethylene compositions according to this invention, having varying contents of peroxides, are set forth in comparison with the corresponding data of a high molecular polyethylene having a molecular weight of 2,000,000 (standard value) and a high molecular polyethylene having a molecular weight of 8,000,000, respectively.

TABLE

| Polyethylene Molecular Weight | Peroxide Present | Wear |
| --- | --- | --- |
| 2,000,000 | None | 100 |
| 2,000,000 | 0.2% 3-phenyl-3-tert.-butylperoxy-phthalide | 78 |
| 2,000,000 | 0.3% 3-phenyl-3-tert.-butylperoxy-phthalide | 75 |
| 2,000,000 | 0.5% 3-phenyl-3-tert.-butylperoxy-phthalide | 60 |
| 2,000,000 | 0.6% 3-phenyl-3-tert.-butylperoxy-phthalide | 58 |
| 2,000,000 | 1.0% cumylperoxide | 81 |
| 2,000,000 | 2.0% 3-phenyl-3-tert.-butylperoxy-phthalide | 85 |
| 8,000,000 | None | 55 |

As can be seen from the Table, only a small improvement in wear resistance over the standard is obtained with the addition of higher amounts of peroxides (1 to 2%). This results from the fact, that under these conditions a considerable decrease of the mechanical properties of the product occurs. Furthermore, the Table shows that the wear resistance of polyethylenes having the extremely high molecular weight of 8,000,000 does not deviate considerably from that of the peroxide-containing compositions according to this invention.

The compositions of this invention are employed for the preparation of moulded articles which must resist high mechanical stress in the dry as well as in the wet state without considerable abrasion, as for the example equipment used in the paper and cellulose industry such as suction box covers, sieve-table plates, borders, scraper blades, skimmers, packings and so on.

The following examples illustrate the improved properties of the polyethylene compositions of the present invention. The high molecular weight polyethylene used as starting material in the examples below has the following properties:

| density | | 0.935 g/cm$^3$ |
| --- | --- | --- |
| tensile strength | 120°C | 37 kp/cm$^2$ |
| tear resistance | | 230 kp/cm$^2$ |
| elongation | | 910% |
| impact strength with pointed notch | | 161 kpcm/cm$^2$ |
| wear resistance | | 100 |

EXAMPLE 1

99.2 g of polyethylene powder having a molecular weight of 2,000,000 were admixed with 0.1 g calcium stearate, 0.1 g $\beta,\beta'$-thiodipropionic acid-dilaurylester, and 0.6 g of a mixture of 40% by weight phthalide peroxide and 60% by weight $SiO_2$.

The mixture was precompressed in a moulding press at ambient temperature at 100 kp/cm$^2$, plasticized at 200°C at a pressure of 50 kp/cm$^2$ and the resulting plate cooled at 100 kp/cm$^2$. Test samples having the following physical properties were prepared from the plate.

| density | | 0.934 g/cm$^3$ |
| --- | --- | --- |
| tensile strength | 120°C | 36 kp/cm$^2$ |
| tear resistance | | 163 kp/cm$^2$ |
| elongation | | 613% |
| impact strength with pointed notch | | 143 kpcm/cm$^2$ |
| wear resistance | | 78 |

EXAMPLE 2

98.8 g of a polyethylene powder having a molecular weight of 2,000,000 were intimately admixed with 0.1 g calciumstearate, 0.1 g $\beta,\beta'$-thiodipropionic aciddilaurylester and 1 g of a mixture of 50% by weight dicumylperoxide and 50% by weight $SiO_2$.

The admixture was precompressed at ambient temperature at a pressure of 100 kp/cm$^2$, plasticized at 200°C with 50 kp/cm$^2$ and the plate cooled at 100 kp/cm$^2$. Test samples having the following physical properties were prepared from the plate.

| density | | 0.932 g/cm$^3$ |
| --- | --- | --- |
| tensile strength | 120°C | 34 kp/cm$^2$ |
| tear resistance | | 119 kp/cm$^2$ |
| elongation | | 515% |
| impact strength with pointed notch | | 104 kpcm/cm$^2$ |
| wear resistance | | 65 |

EXAMPLE 3

98.8 g of a polyethylene powder having a molecular weight of 2,000,000 were intimately admixed with 0.1 g calciumstearate, 0.1 g $\beta,\beta'$-thiodipropionic acid-dilaurylester and 1 g of a mixture of 40% by weight phthalideperoxide and 60% by weight $SiO_2$. The admixture was formed to a round profile having a diameter of 20 mm by means of a ram extruder under the pressure set forth in example 1. The following data were determined from samples of the round profile:

| density | | 0.933 g/cm³ |
|---|---|---|
| tensile strength } | 120°C | 32 kp/cm² |
| tear resistance } | | 107 kp/cm² |
| elongation } | | 465% |
| impact strength with pointed notch | | 98 kpcm/cm² |
| wear resistance | | 67 |

EXAMPLE 4 (comparison example with addition of a higher amount of peroxide)

97.8 g of polyethylene having a molecular weight of 2,000,000 were admixed with 0.1 g calciumstearate, 0.1 g $\beta,\beta'$-thiodipropionic acid-dilaurylester and 2% by weight pure phthalideperoxide and pressed to plates as described in example 1. The following physical data were determined from these plates:

| density | | 0.925 g/cm³ |
|---|---|---|
| tensile strength } | | 18 kp/cm² |
| tear resistance } | 120°C | 51 kp/cm² |
| elongation } | | 341% |
| impact strength with pointed notch | | 81 kpcm/cm² |
| wear resistance | | 85 |

It can be seen that the mechanical properties are severely impaired and the wear resistance is decreased by the addition of an excessive amount of peroxide.

The phthalideperoxide used in examples 1, 3 and 4 was 3-phenyl-3-t-butyl-peroxyphthalide.

EXAMPLE 5

99 g of a polyethylene powder having a molecular weight of 2 000 000 were intimately admixed with 0.1 g calciumstearate, 0.1 g $\beta,\beta'$-thiodipropionic acid-dilaurylester and 0.8 g of a mixture of 40 % by weight 3-ethyl-3-t-butyl-peroxyphthalide and 60 % by weight $SiO_2$.

The mixture was precompressed in a moulding press at ambient temperature at 100 kp/cm², plasticized at 200°C at a pressure of 50 kp/cm² and the resulting plate cooled at 100 kp/cm². Test samples having the following physical properties were prepared from the plate.

| density | | 0.932 g/cm³ |
|---|---|---|
| tensile strength } | | 34 kp/cm² |
| tear resistance } | 120°C | 157 kp/cm² |
| elongation } | | 598 % |
| impact strength with pointed notch | | 139 kpcm/cm² |
| wear resistance | | 71 |

EXAMPLE 6

99 g of a polyethylene powder having a molecular weight of 2 000 000 were intimately admixed with 0.1 g calciumstearate, 0.1 g $\beta,\beta'$-thiodipropionic acid-dilaurylester and 0.8 g of a mixture of 40 % by weight 3-p-chlorophenyl-3-t-butyl-peroxyphthalide and 60 % by weight $SiO_2$.

The mixture was precompressed in a moulding press at ambient temperature at 100 kp/cm², plasticized at 200°C at a pressure of 50 kp/cm² and the resulting plate cooled at 100 kp/cm². Test samples having the following physical properties were prepared from the plate.

| density | | 0.933 g/cm³ |
|---|---|---|
| tensile strength } | | 35 kp/cm² |
| tear resistance } | 120°C | 171 kp/cm² |
| elongation } | | 622 % |
| impact strength with pointed notch | | 137 kpcm/cm² |
| wear resistance | | 70 |

EXAMPLE 7

98.8 g of a polyethylene powder having a molecular weight of 2 000 000 were intimately admixed with 0.1 g calciumstearate, 0.1 g $\beta,\beta'$-thiodipropionic acid-dilaurylester and 1 g of a mixture of 50 % by weight 3-methyl-3-t-amyl-peroxyphthalide and 50 % by weight $SiO_2$.

The mixture was precompressed in a moulding press at ambient temperature at 100 kp/cm², plasticized at 200°C at a pressure of 50 kp/cm² and the resulting plate cooled at 100 kp/cm². Test samples having the following physical properties were prepared from the plate.

| density | | 0.932 g/cm³ |
|---|---|---|
| tensile strength } | | 33 kp/cm² |
| tear resistance } | 120°C | 131 kp/cm² |
| elongation } | | 542 % |
| impact strength with pointed notch | | 123 kpcm/cm² |
| wear resistance | | 66 |

EXAMPLE 8

99.2 g of a polyethylene powder having a molecular weight of 2 000 000 were intimately admixed with 0.1 g calciumstearate, 0.1 g $\beta,\beta'$-thiodipropionic acid-dilaurylester and 0.6 g of a mixture of 40 % by weight 1.3-di-t-butyl-peroxydiisopropylbenzol and 60 % by weight $SiO_2$.

The mixture was precompressed in a moulding press at ambient temperature at 100 kp/cm², plasticized at 200°C at a pressure of 50 kp/cm² and the resulting plate cooled at 100 kp/cm². Test samples having the following physical properties were prepared from the plate.

| density | | 0.934 g/cm³ |
|---|---|---|
| tensile strength } | | 35 kp/cm² |
| tear resistance } | 120°C | 171 kp/cm² |
| elongation } | | 636 % |
| impact strength with pointed notch | | 141 kpcm/cm² |
| wear resistance | | 69 |

EXAMPLE 9

98.8 g of a polyethylene powder having a molecular weight of 2 000 000 were intimately admixed with 0.1 g calciumstearate. 0.1 g $\beta,\beta'$-thiodipropionic acid-dilaurylester and 1 g of a mixture of 50 % by weight 2.5-dimethyl-2.5-di-(t-butyl-peroxy)-hexane and 50 % by weight $SiO_2$.

The admixture was formed to a round profile having a diameter of 20 mm by means of a ram extruder under the pressure set forth in example 1. The following data were determined from samples of the round profile:

| | | |
|---|---|---|
| density | | 0.932 g/cm³ |
| tensile strength | | 33 kp/cm² |
| tear resistance | 120°C | 112 kp/cm² |
| elongation | | 531 % |
| impact strength with pointed notch | | 117 kpcm/cm² |
| wear resistance | | 66 |

The term phthalideperoxides (or peroxyphthalides) characterizes compounds of the formula

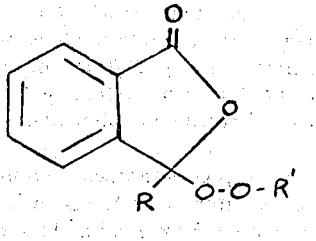

wherein R is a phenyl-group which may be substituted by alkylgroups having 1 to 3 carbon atoms or halogen atoms, preferably chlorine atoms or an alkyl group having 1 to 3 carbon atoms and R' is a tertiary alkyl group having 4 or 5 carbon atoms.

What is claimed is:

1. A method for preparing a polyethylene composition having high wear resistance which comprises
   homogeneously mixing a peroxide cross-linking agent with a polyethylene powder having a viscosimetrically determined molecular weight of at least 1,000,000, said cross-linking agent being present in an amount of 0.2 to 0.6% by weight
   pre-compressing the mixture at pressure of at least 50 kp/cm² to obtain a pre-compressed polyethylene mixture,
   plasticizing the mixtue at a temperature of at least about 200°C at a pressure of at least 50 kp/cm², and
   cooling the plasticized mixture to obtain the polyethylene composition of high wear resistance.

2. The method of claim 1 in which the mixing step is further characterized by the addition of an inert carrier material.

3. The method of claim 2 in which the inert carrier material is SiO₂ and which is present in an amount of 50 to 100 percent by weight, based upon the weight of the peroxide cross-linking agent.

4. The method of claim 1 in which the plasticized mixture is cooled under a pressure of at least 100 kp/cm².

5. The method of claim 1 in which the peroxide is a peroxyphthalide compound.

6. The method of claim 1 in which the peroxide is 3-phenyl-3-(t-butyl)peroxyphthalide.

7. A polyethylene composition of high wear resistance comprising a polyethylene polymer having a viscosimetrically determined molecular weight of at least 1,000,000 containing 0.2 to 0.6% by weight of a peroxide cross-linking agent, and which has been precompressed in a pressure of at least 50 kp/cm², plasticized at a temperature of at least about 200°C at a pressure of at least 50 kp/cm², and cooled.

8. A polyethylene composition of high wear resistance comprising a polyethylene polymer having a viscosimetrically determined molecular weight of at least 1,000,000 containing a peroxide cross-linking agent, which has been precompressed at a pressure of at least 50 kp/cm², plasticized at a temperature of at least about 200°C at a pressure of at least 50 kp/cm² and cooled.

9. The composition of claim 8 in which the peroxide is present in an amount of 0.2 to 0.6 per cent by weight.

10. The composition of claim 8 in which the peroxide cross-linking agent is a peroxyphthalide compound.

11. The composition of claim 8 is further characterized in that it contains an inert carrier material.

12. The composition of claim 11 in which the inert carrier material is SiO₂.

13. The composition of claim 12 in which the SiO₂ is present in an amount of about 50 to 100 per cent by weight based on the weight of the peroxide cross-linking agent.

14. The composition of claim 8 in which the peroxide cross-linking agent is 3-phenyl-3-(t-butyl)peroxyphthalide.

* * * * *